US010087998B2

(12) United States Patent
Goossens et al.

(10) Patent No.: US 10,087,998 B2
(45) Date of Patent: Oct. 2, 2018

(54) METHOD TO CONTROL CLUTCH FORCE IN A CLUTCH PACK

(71) Applicant: DANA AUTOMOTIVE SYSTEMS GROUP, LLC, Maumee, OH (US)

(72) Inventors: Stijn Goossens, Erpe-Mere (BE); Mark R. J. Versteyhe, Oostkamp (BE); Thomas J. Vyncke, Deinze (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/527,567

(22) PCT Filed: Nov. 16, 2015

(86) PCT No.: PCT/US2015/060824
§ 371 (c)(1),
(2) Date: May 17, 2017

(87) PCT Pub. No.: WO2016/081347
PCT Pub. Date: May 26, 2016

(65) Prior Publication Data
US 2017/0356510 A1   Dec. 14, 2017

Related U.S. Application Data

(60) Provisional application No. 62/081,948, filed on Nov. 19, 2014.

(51) Int. Cl.
*F16D 48/06* (2006.01)
*F16D 28/00* (2006.01)
(Continued)

(52) U.S. Cl.
CPC ............ *F16D 48/064* (2013.01); *B60K 17/02* (2013.01); *B60K 17/34* (2013.01); *F16D 23/12* (2013.01);
(Continued)

(58) Field of Classification Search
CPC .. F16D 48/064; F16D 28/00; F16D 2023/123; F16D 2500/1023;
(Continued)

(56) References Cited

U.S. PATENT DOCUMENTS 5,337,868 A * 8/1994 Liu ........................ B60W 10/02
477/74
5,337,874 A * 8/1994 Oltean ................... B60W 10/02
192/111.12

(Continued)

FOREIGN PATENT DOCUMENTS

DE   102013214192 A1   2/2014
EP      1820990 A1      8/2007
(Continued)

OTHER PUBLICATIONS

European Patent Office, The International Search Report and Written Opinion, issued in PCT/CA2015/060824, dated Feb. 26, 2016, 7 pages, The European Patent Office, Rijswijk, Netherlands.

*Primary Examiner* — Jacob S. Scott
*Assistant Examiner* — Tinh Dang
(74) *Attorney, Agent, or Firm* — Marshall & Melhorn, LLC

(57) ABSTRACT

A method to estimate an amount of force in a clutch pack of a clutch actuation system. The method includes engaging an actuation motor to apply a set point force to the clutch pack and monitoring a position of the actuation motor when the set point force is applied. Additionally, the method includes determining one or more clutch clamping curves and one or more clutch releasing curves based on a relationship between the position of the actuation motor and an amount of torque applied by the actuation motor at position of the actuation motor. The method further includes modeling one or more frictional characteristics of the clutch actuation system and estimating an amount of clamping and releasing (Continued)

force within the clutch pack by using a control unit. The amount of torque applied to the clutch pack between the clutch clamping and releasing curves at the set point force is maintained.

17 Claims, 4 Drawing Sheets

(51) Int. Cl.
*B60K 17/02* (2006.01)
*F16D 23/12* (2006.01)
*G07C 5/08* (2006.01)
*B60K 17/34* (2006.01)

(52) U.S. Cl.
CPC ............. *F16D 28/00* (2013.01); *F16D 48/06* (2013.01); *G07C 5/0808* (2013.01); *G07C 5/0816* (2013.01); *F16D 2023/123* (2013.01); *F16D 2500/1023* (2013.01); *F16D 2500/1045* (2013.01); *F16D 2500/1064* (2013.01); *F16D 2500/1066* (2013.01); *F16D 2500/10412* (2013.01); *F16D 2500/10431* (2013.01); *F16D 2500/3024* (2013.01); *F16D 2500/3026* (2013.01); *F16D 2500/3065* (2013.01); *F16D 2500/30412* (2013.01); *F16D 2500/5043* (2013.01); *F16D 2500/50236* (2013.01); *F16D 2500/50251* (2013.01); *F16D 2500/7082* (2013.01); *F16D 2500/70404* (2013.01); *F16D 2500/70406* (2013.01); *F16D 2500/70418* (2013.01); *F16D 2500/70458* (2013.01); *F16D 2500/70605* (2013.01); *F16D 2500/7101* (2013.01)

(58) Field of Classification Search
CPC ... F16D 2500/10431; F16D 2500/1045; F16D 2500/3024; F16D 2500/3026; F16D 2500/70406; F16D 2500/7082; F16D 2500/7101; B60K 17/02; B60K 17/34; B60K 23/12; G07C 5/0808; G07C 5/0816
See application file for complete search history.

(56) References Cited

U.S. PATENT DOCUMENTS

| | | | | |
|---|---|---|---|---|
| 5,378,211 | A * | 1/1995 | Slicker | B60W 10/02 477/175 |
| 5,634,867 | A * | 6/1997 | Mack | B60W 10/02 477/122 |
| 6,086,514 | A * | 7/2000 | Jones | B60W 10/02 477/180 |
| 6,808,052 | B2 | 10/2004 | Kirkwood et al. | |
| 6,851,537 | B2 | 2/2005 | Bowen | |
| 7,101,310 | B2 * | 9/2006 | Smith | F16D 48/06 318/433 |
| 7,125,364 | B2 | 10/2006 | Cring | |
| 7,258,648 | B2 | 8/2007 | Smith et al. | |
| 7,306,545 | B2 | 12/2007 | Lanker | |
| 7,445,581 | B2 | 11/2008 | Cring | |
| 7,611,441 | B2 | 11/2009 | Cring | |
| 8,231,505 | B2 | 7/2012 | Fan et al. | |
| 8,332,110 | B2 | 12/2012 | Vogel et al. | |
| 8,738,256 | B2 | 5/2014 | Connolly et al. | |
| 9,562,576 | B2 | 2/2017 | Hodrus | |
| 2004/0173428 | A1 | 9/2004 | Bowen | |
| 2007/0199790 | A1 | 8/2007 | Whitmer et al. | |
| 2010/0004837 | A1 | 1/2010 | Connolly et al. | |
| 2010/0160112 | A1 | 6/2010 | Giorgini | |

FOREIGN PATENT DOCUMENTS

| | | |
|---|---|---|
| JP | 63065309 A | 3/1988 |
| JP | 02173424 A | 4/1990 |
| JP | 2001263376 A | 9/2001 |
| JP | 2004176735 A | 6/2004 |
| JP | 2004197842 A | 7/2004 |
| JP | 2006010026 A | 12/2006 |
| JP | 2010254058 A | 11/2010 |
| JP | 2011106670 A | 6/2011 |
| WO | 2011/149903 A1 | 12/2011 |

* cited by examiner

METHOD TO CONTROL CLUTCH FORCE IN A CLUTCH PACK

CROSS-REFERENCE TO RELATED APPLICATIONS

This application claims priority to and benefit from U.S. Patent Application Ser. No. 62/081,948 filed on Nov. 19, 2014 which is currently pending and fully incorporated by reference herein.

BACKGROUND OF THE DISCLOSURE

Vehicles that include all-wheel drive capability have many advantages over vehicles that are driven using a single axle. Specifically, vehicles that include all-wheel drive capability have increased traction and enhanced drivability over similar vehicles that are driven using a single axle. All-wheel drive vehicles, however, do have some disadvantages.

Drivelines of all-wheel drive vehicles typically include many more moving components than a driveline of a vehicle having a single drive axle. Moving these components requires additional power, so all-wheel drive vehicles tend to have a fuel economy that is lower than that of vehicles having a single drive axle. This is particularly true when the all-wheel drive vehicle is operated in a manner that does not disconnect a second drive axle from a remaining portion of the driveline.

To improve the fuel economy of all-wheel drive vehicles, vehicle manufacturers have incorporated active differentials into the driveline. A control system in communication with the active differential is used to engage partially engage, or disengage the differential. In addition to disengaging the second drive axle from a remaining portion of the driveline, active differentials provide the benefit of being able to control an amount of torque applied to the second drive axle or a portion of the second drive axle.

Actuation systems typically used with active differentials typically comprise an actuation motor, a force translational device, and a clutch pack. Through the force translational device, force applied by the actuation motor is applied to the clutch pack, at least variably engaging two components of the driveline. The amount of force needed to engage the clutch pack can vary as the actuation system wears. Current systems, however, apply the same electrical current to the actuation motor, which applies the same force in all situations. It would be better to accurately estimate the amount of force needed to actuate the clutch, and thus estimate the current needed to only actuate the motor as much as needed, so the system is appropriate sized and operating efficiently.

SUMMARY OF THE DISCLOSURE

A method to estimate force in a clutch pack includes engaging an actuation motor to produce a motor torque to apply a set point force to a clutch pack. The amount of motor torque being applied to the clutch pack at the set point force is monitored. The amount of motor torque being applied to the clutch between a clutch clamping curve and a clutch releasing curve at the set point force is maintained.

The above, as well as other advantages of the present disclosure, will become readily apparent to those skilled in the art from the following detailed description when considered in light of the accompanying drawings in which:

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
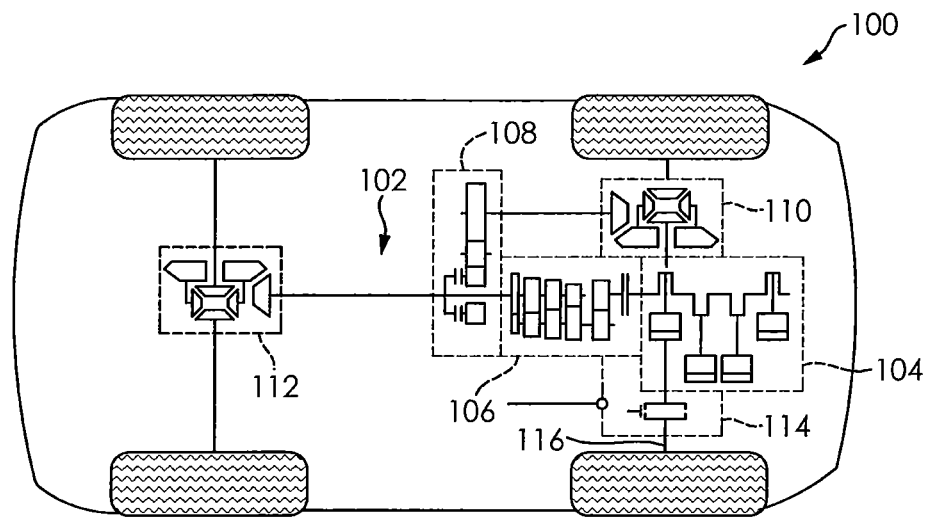
FIG. 1 is a schematic diagram of a vehicle having all wheel drive functionality in accordance with the present disclosure.

FIG. 1 illustrates a vehicle 100 having a driveline 102 with all-wheel drive functionality. The vehicle has an engine 104, where the engine 104 is connected to a transmission 106. The transmission 106 is connected to a transfer case 108. The transfer case 108 splits power from the transmission 106 to a front axle differential 110 and a rear axle differential 112. A clutch 114 associated with the front axle 116 can disconnect or connect the front axle 116 with the rest of the driveline 102.

The transfer case 108 includes a clutch actuation system, or the transfer case may be in communication with the clutch actuation system. The clutch actuation system may be such as depicted in FIG. 3.

Figure 2:
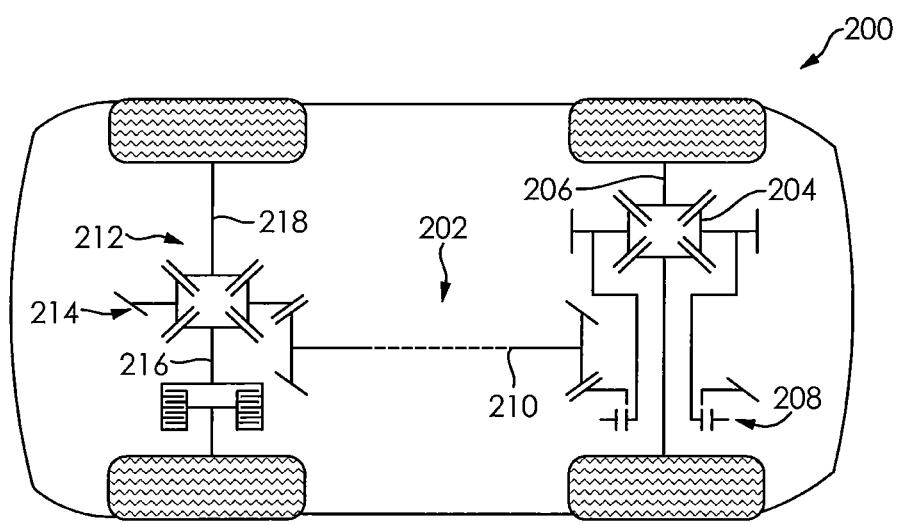
FIG. 2 is a schematic diagram of another vehicle having all wheel drive functionality in accordance with the present disclosure.

FIG. 2 illustrates a vehicle 200 having a driveline 202 with all-wheel drive functionality. The vehicle has an engine (not shown but as in FIG. 1), where the engine is connected to a transmission (not shown but as in FIG. 1). The transmission is connected to a front axle differential 204. The front axle differential 204 provides rotation to the front axle 206.

A dog clutch or a power-take off 208 on, or in connection with, the front axle differential 204 is provided. The power-take off 208 provides rotation to a propeller shaft 210 extending to a rear axle system 212. The rear axle system 212 comprises a rear differential 214. Rear axle half shafts 216, 218 are connected to the rear differential 214 and extend therefrom. One rear axle half shaft 216 extends to a clutch actuation system as depicted in FIG. 3.

Figure 3:
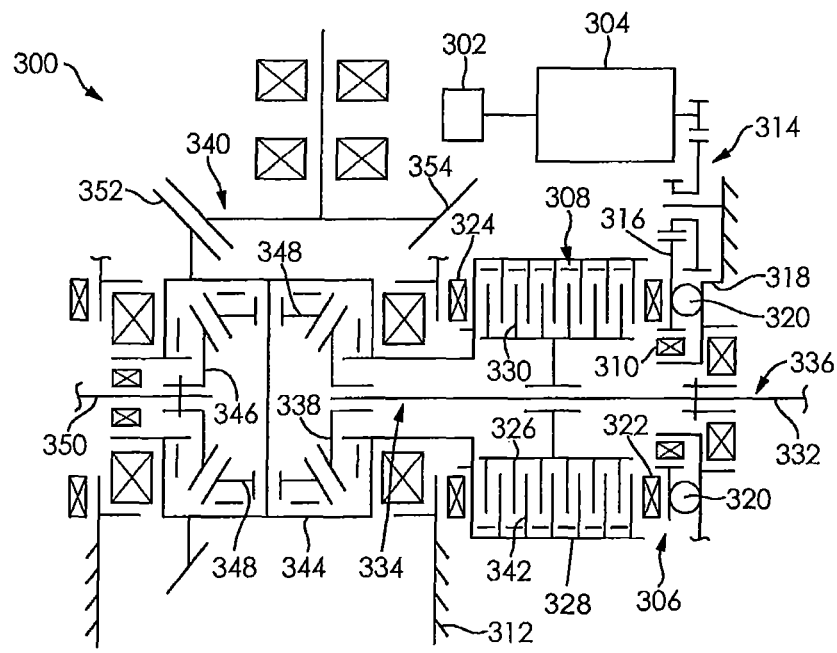
FIG. 3 is a schematic diagram of a clutch actuation system in accordance with the present disclosure.

FIG. 3 illustrates the clutch actuation system 300. The clutch actuation system 300 comprises a control unit 302, an actuation motor 304, a force translational device 306, and a clutch pack 308. The force translational device 306 shown in FIG. 3 is a ball and ramp actuator, but it is understood that the force translational device 306 may be any type of actuator that converts rotational motion into translational motion to load the clutch pack 308. The actuation motor 304 and the force translational device 306 are located adjacent the clutch pack 308. A bearing 310 supports rotation of the force translational device 306 within a housing 312 when the force translational device 306 is placed in an engaged position. The clutch actuation system 300 is shown being used with a rear drive unit similar to the rear drive unit 112, but it is understood that the clutch actuation system 300 may be used with other types of drive units that facilitate driving variable engagement between a driving and driven driveline component.

The actuation motor 304 may be such as a reversible electric motor as it is compact and easily controllable. It will be appreciated that any other appropriate type of actuator may be used, such as hydraulic or pneumatic, and these are within the scope of this disclosure. The actuation motor 304 is capable of applying a predetermined amount of torque based on a control signal received from the control unit 302. Alternately, the actuation motor 304 may be configured to relay an amount of torque applied by the actuation motor 304 to the control unit 302.

The actuation motor 304 drives a gear set 314, which is a reduction set of gears. As shown in FIG. 3, a gear of the actuation motor 304 drives a second gear, which in turn drives a third gear. The gear set 314 achieves a desired torque speed reduction between the actuation motor 304 and the third gear. Other gear numbers and orientations of the gear set 314 are possible other than as shown to result in different speeds and torques.

The third gear is in driving engagement with an actuating ring 316. More preferably, the actuating ring 316 has a set of teeth on an outer radial surface that engages with the teeth on the third gear. The teeth of the actuating ring 316 are circumferentially extending from a peripheral edge of the actuating ring 316. The teeth of the actuating ring 316 may cover the full circumference of the actuating ring 316 or a portion of the circumference. The rotation of the third gear drives the teeth of the actuating ring 316, thus rotating the actuating ring 316.

The actuating ring 316 is part of the force translational device 306. The force translational device 306 also comprises a pressure plate 318 and a plurality of balls 320 between the pressure plate 318 and the actuating ring 316.

The pressure plate 318 resists an axial force applied thereto, causing the actuating ring 316 to apply a force to a first thrust bearing 322 located adjacent thereto. The force applied to the first thrust bearing 322 is used to load the clutch pack 308. The pressure plate 318 is non-rotatably mounted within the housing 312.

An annular radial surface of the pressure plate 318 facing the actuating ring 316 is formed with a set of circumferentially extending grooves (not shown) of varying axial depth. The grooves in the pressure plate 318 face complementary grooves (not shown) on an opposite annular surface of the actuating ring 316, whose depth varies in the opposite circumferential sense.

A corresponding number of the balls 320 are disposed between the pressure plate 318 and the actuating ring 316, one in each pair of the facing grooves. It is understood that the balls 320 may also be rollers which function in a similar manner.

Alternatively, a cam disc actuator (not shown) including cooperative cam surfaces provided on opposite sides of an actuating ring and a pressure collar may be used. It is also appreciated that other types of actuators may be used.

It will be further appreciated that when the actuation motor 304 moves the actuating ring 316 angularly relative to the pressure plate 318, the actuating ring 316 moves axially and causes the actuating ring 316 to frictionally load the clutch pack 308. The axial movement of the actuating ring 316 is transmitted to the clutch pack 308 through the first thrust bearing 322. The first thrust bearing 322 is provided between the actuating ring 316 and the clutch pack 308 to allow for relative rotation and to reduce the friction between the actuating ring 316 and the clutch pack 308. A second thrust bearing 324 allows for relative rotation and to reduce the friction between a clutch can and the housing 312.

The clutch pack 308 is comprised of an inner hub 326 and an outer hub 328. The inner hub 326 is located radially inward and concentric with the outer hub 328. A plurality of radially outwardly extending clutch plates 330 are mounted for axial movement along the inner hub 326. The inner hub 326 is connected to, such as through splines, a first axle half shaft 332. One end 334 of the first axle half shaft 332 is connected to a first side gear 338 of a differential 340, the other end 336 of the first axle half shaft 332 extends to a first wheel end.

The plurality of radially outwardly extending clutch plates 330 mounted for axial movement along the inner hub 326 are interleaved with a plurality of radially inwardly extending clutch plates 342 mounted for axial movement on the outer hub 328. The outer hub 328 is connected to a differential case 344.

The differential case 344 contains the first side gear 338, a second side gear 346 and two differential pinion gears 348 meshed with the side gears 338, 346. A second axle half shaft 350 extends from the second side gear 346 to a second wheel end.

The differential case 344 is connected to a ring gear 352. A pinion gear 354 is meshed with the ring gear 352. The pinion gear 354 is connected to a source for rotation, such as an engine, a transmission, or a propeller shaft to impart rotation to the ring gear 352, and thus the differential 340.

The clutch actuation system 300 is used to estimate a force applied by the clutch pack 308 between a driving and driven driveline component. The control unit 302 performs the estimate using one of two methods or by fusing the estimates performed using both methods into a single estimation.

In addition to estimating a force applied by the clutch pack 308, the control unit 302 may also decrease a torque applied by the actuation motor 304. Where the clutch actuation system 300 is electrically operated, such a decrease in torque applied also decreases a power consumption of the clutch actuation system 300 for a given output torque. In more general terms, the control unit 302 decreases the actuation power needed by the clutch actuation system 300.

In a first method for estimating the force applied by the clutch pack, the control unit 302 estimates a force applied by the clutch pack 308 directly based on an applied torque by the actuation motor 304. The force applied by the clutch pack 308 (which for the purpose of describing the first method, can be represented as $F_{clutch}$) can be derived using the following steps.

Firstly, the applied torque by the actuation motor 304 is either estimated or obtained. The applied torque is directly proportional to the current in the actuation motor. Therefore, the current can be measured and the applied torque can be determined.

Next, the friction characteristics of the clutch actuation system 300, specifically, but not limited to, the clutch pack 308 are modeled. The modeling can be accomplished by knowing the frictional coefficients associated with the various parts of the system, including the clutch pack.

Lastly, an acceleration and an inertia of the clutch actuation system 300, specifically, but not limited to, the clutch pack 308 are estimated to compensate for any inertial effects caused by the applied torque of the actuation motor 304.

To use the first method, the control unit 302 receives signals needed to perform the estimation. The signals may be such as the actuation motor current, the friction coefficients of the system and the acceleration and inertia of the system. The control unit 302 may also receive signals concerning an operating condition of the clutch actuation system 300 (such as a temperature signal or an estimation of temperature).

Figure 4:
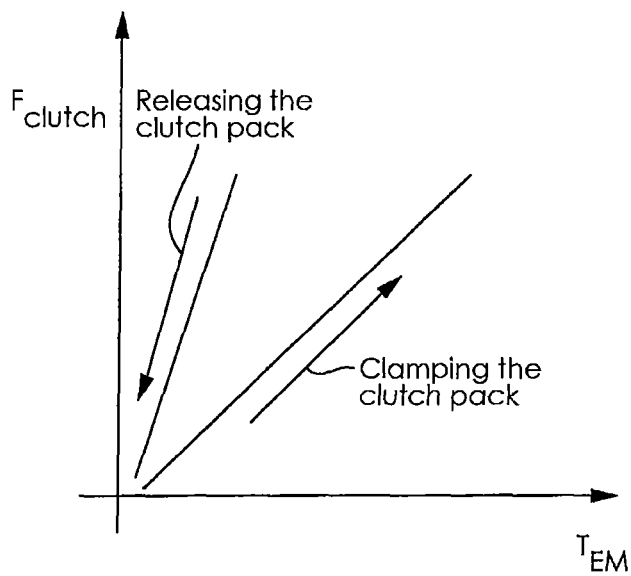
FIG. 4 is a graph illustrating an exemplary actuation and release of the clutch actuation system shown in FIG. 3 according to a first method of the disclosure.

FIG. 4 is a graph illustrating an exemplary actuation and release of the clutch actuation system 300 according to the first method described hereinabove. FIG. 4 illustrates that the clutch actuation system 300 exhibits a significant amount of Coulomb friction. Specifically, it can be appreciated from FIG. 4 that as the torque of the actuation motor increases during clutch pack clamping and the force on the clutch increases, a portion of the motor torque is allocated for the power needed to clamp the clutch and a portion of the motor torque is allocated for overcoming the friction in the system. Similarly, when the clutch pack is released, a portion of the motor torque is used to release the clutch pack and a portion of the motor torque is allocated for overcoming the friction in the system. As a result, a different relationship between the force applied by the clutch pack 308 ($F_{clutch}$) and the applied torque by the actuation motor 304 ($T_{EM}$) will occur when the system is actuating or releasing the clutch pack 308.

In an alternative method, the control unit 302 estimates a force applied by the clutch pack 308 based on an observation that a friction coefficient of the clutch pack 308 is symmetrical during the operations of actuating or releasing the clutch pack 308. The force applied by the clutch pack 308 can be derived using the following steps.

Firstly, an indication of a position of a plurality of plates of the clutch pack 308 is communicated to the control unit 302. As a non-limiting example, a rotational position of the actuation motor 304 may be used. If the clutch pack 308 is clamped and released in a relatively quick manner, the rotational position of the actuation motor 304 at least partially covers the same clutch positions, and therefore the friction force can be eliminated due to the fact that the sign of the friction (according to the Coulomb model) changes but an absolute value is substantially identical. The control unit 302 may receive signals concerning an actuation (such as motor voltage, current and motor speed for example) of the clutch actuation system 300. Further, the control unit 302 may receive signals concerning an operating condition of the clutch actuation system 300 (such as a temperature, a mode of travel, and an operational speed, for example).

The following equations are used to estimate a clamping force and a release force which are applied by the actuation motor 304. For use with these equations, force generated by the force translational device 306 is estimated.

$$\text{Clamping: } CF_{BR} + J\frac{d^2\theta_{clamp}}{dt^2} + Tf = Tem_{,clamp}$$

$$\text{Releasing: } CF_{BR} + J\frac{d^2\theta_{release}}{dt^2} - Tf = Tem_{,release}$$

Through the combination of the above equations, an estimation of a force generated by the force translational device 306 for every position of the clutch actuation system 300 can be performed.

$$F_{BR} = \frac{1}{2C}\left(Tem_{,clamp} + Tem_{,release} - J\left(\frac{d^2\theta_{clamp}}{dt^2} + \frac{d^2\theta_{release}}{dt^2}\right)\right)$$

Figure 5:
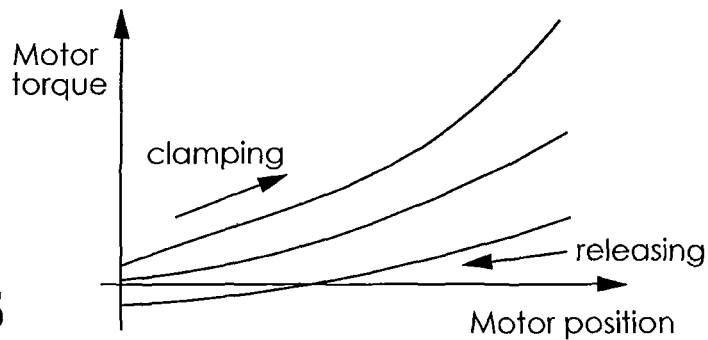
FIG. 5 is a graph illustrating an exemplary actuation and release of the clutch actuation system shown in FIG. 3 according to a second method of the disclosure.

FIG. 5 is a graph illustrating an exemplary actuation and release of the clutch actuation system 300 according to the second method described hereinabove. The equation above can be used to generate a line between the clamping and releasing lines in FIG. 5. It is within the scope of this disclosure that the clamping line, releasing line and the line generated between the clamping and releasing lines may be substantially linear or curved in shape. It can be appreciated that the line between the clamping and releasing lines can vary its position on the graph as the clutch system experiences wear, temperature effects, etc. The second method predicts the position of the line between the clamping and releasing lines in view of these variations. The line between the clamping and releasing lines illustrated in FIG. 5 demonstrates the symmetrical nature of the friction coefficient of the clutch pack during actuation and release of the clutch pack.

The estimation of the force generated by the force translational device 306 using the above described relations can then be used to update or learn a relationship between the force generated by the clutch pack 308 and a position of the clutch pack 308 by using known mathematical methods. The advantage of using the above described relations is that the methods above do not require knowledge about the parameters of the friction behavior of the actuation mechanism of the clutch pack 308.

Figure 6:
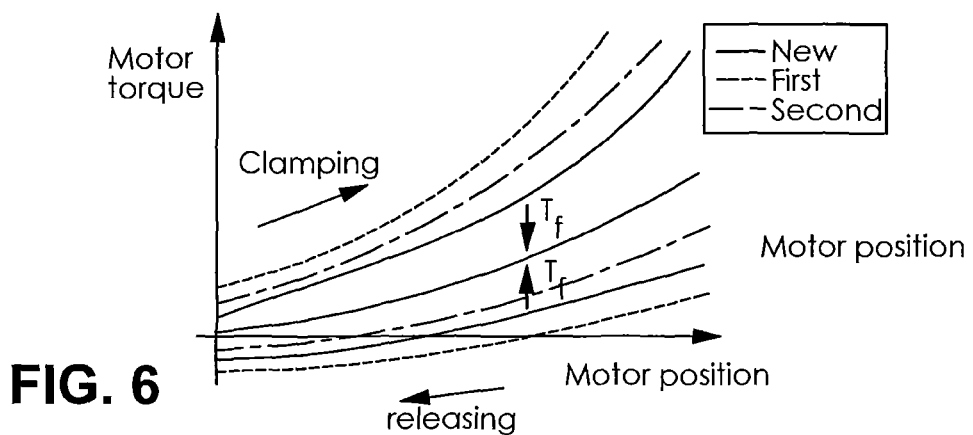
FIG. 6 is a graph illustrating a set of measurements of a force versus position relation for both actuation and release of the clutch actuation system shown in FIG. 3 according to the second method of the disclosure.

An achieved position for a same applied torque of the actuation motor 304 can vary over a course of time. As a non-limiting example, this may be due to wear of the plurality of clutch plates forming the clutch pack 308. Measurements which are used to indicate the variance are collected during the actuation and releasing of the clutch actuation system 300. These measurements are sorted by type (actuation or release) and stored in a memory of the control unit 302. During actuation, a force versus position relation of the actuation motor 304 and force translational device 306 can be updated by the control unit 302 using the stored measurements. FIG. 6 is a graph illustrating a set of measurements of a force versus position relation for both clamping and releasing the clutch pack by making use of the actuation mechanism. Here again, a line between the clamping and releasing lines can be estimated using the set of measurements and the equation mentioned above so that motor torque for a particular motor position can be known. It is within the scope of this disclosure that the clamping line, the releasing line and the line between the claiming and releasing lines may be substantially linear or curved in shape.

As a result of logging of measurements and an updating of the force versus position relation by the control unit 302, several advantages occur.

Firstly, a friction model for the clutch actuation system 300 can be constructed and updated using the information about the actuation and release force versus position relation, and used to improve an estimation based on the first method described hereinabove. Further, a value of the transitional force, $T_f$, can be calculated from the learned and calculated relations. Additionally, a value of $T_f$ will depend on a speed of the actuation motor 304 during the actuation. Several of these learned relationships can be drawn by classifying the results based on their speed values and or temperature. As such a full friction model for $T_f$, which is dependent on speed and temperature can be identified and used in the first method described hereinabove.

Figure 7:
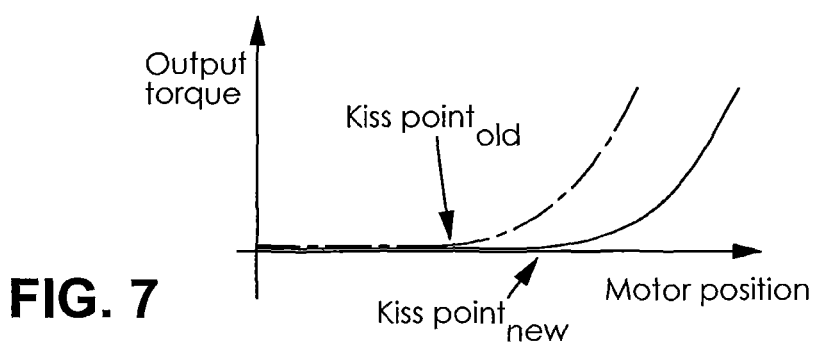
FIG. 7 is a graph illustrating an updating of the kiss point of the clutch actuation system shown in FIG. 3 according to the second method of the disclosure.

Secondly, a complex spring coefficient can be determined using a slope of the force versus position relation. Also, a kiss point (a position of the actuation motor 304 when the plurality of clutch plates of the clutch pack 308 make contact and start transmitting torque), can be updated. FIG. 7 is a graph illustrating an updating of the kiss point of the clutch actuation system 300. This information can be used in the first method described hereinabove and/or to monitor wear of the clutch actuation system 300 and to diagnose problems with the clutch actuation system 300. For example, a new kiss point can be estimated or determined as the clutch plates wear. Thus, the motor position has to reach a larger value before the kiss point is reached compared with the old kiss point when the clutch plates were not as worn. Lastly, the information can be used to synchronize the driveline if necessary.

Figure 8:
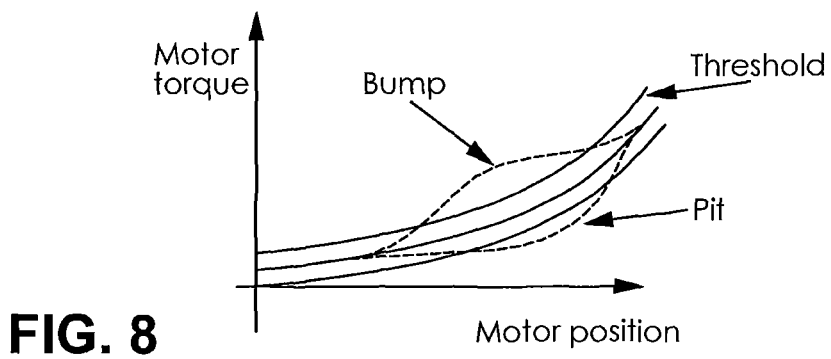
FIG. 8 is a graph illustrating an exemplary bump and pit in the force versus position relation of the clutch actuation system shown in FIG. 3 according to the second method of the disclosure.

Thirdly, bumps or pits in the force versus position relation of the clamping or releasing lines are typically related to damage, wear, or obstacles on the components of the force translational device 306 (such as, but not limited to, a plurality of balls or ball ramps) or the plurality of plates of the clutch pack 308. FIG. 8 is a graph illustrating an exemplary bump and pit in the force versus position relation. Using the information of the bumps and pits, an estimation of the torque can be adapted, also for the first method described hereinabove.

The force versus position relation may also be used by the control unit 302 for diagnostics and prognostics. When a deviation exceeds a certain threshold, such as shown in FIG. 8, the control unit 302 warns an operator of a vehicle including the clutch actuation system 300 for service of the clutch actuation system 300; however, it is understood that wear of the clutch actuation system 300 may be monitored in another way.

Each of the above described methods has their advantages and disadvantages. For example, one method may have a more accurate estimation than the other method in certain situations. As non-limiting examples, one situation which may result in a discrepancy between the methods is a very dynamic actuation of the clutch actuation system 300. As each of the above described methods has its strengths, it is possible and within the scope of this disclosure to fuse the methods with one another.

One example of fusing the above described methods together is by using a Kalman filter. By adapting the parameters of the Kalman filter, each of the above described methods may be optimally used. The application of a Kalman filter may be performed by the control unit 302.

Figure 9:
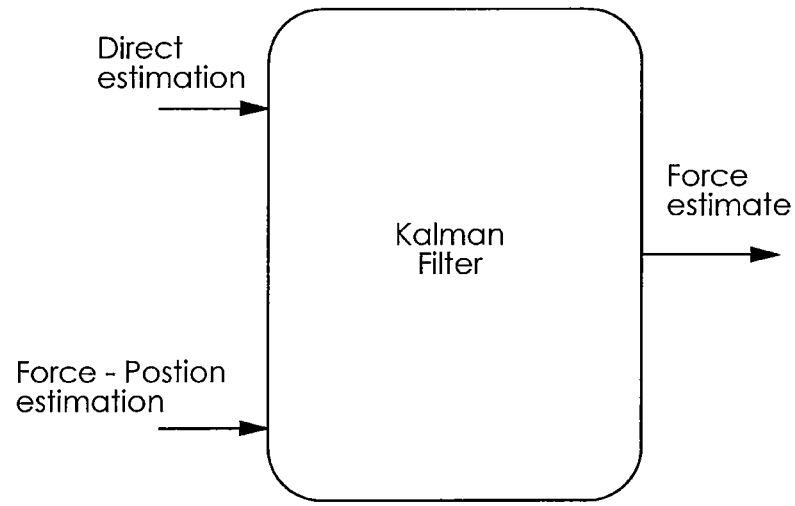
FIG. 9 is a schematic illustration of the application of a Kalman filter by the control unit shown in FIG. 3 according to either method of the disclosure.

FIG. 9 is a schematic illustration of the application of the Kalman filter by the control unit 302.

Another example of fusing the above described methods together is by performing a weighted average of the outputs of the methods. When performing the weighted average, the weights of the outputs of the methods are dynamically adapted. The weighted average may be performed by the control unit 302.

Further, the clutch actuation system 300 can be used to reduce an amount of power consumption for a given output torque level applied by the clutch pack 308. More particularly, the amount of power consumption of the clutch actuation system 300 is reduced without interfering with the ability of the clutch actuation system 300 to achieve or hold a certain output torque level.

Figure 10:
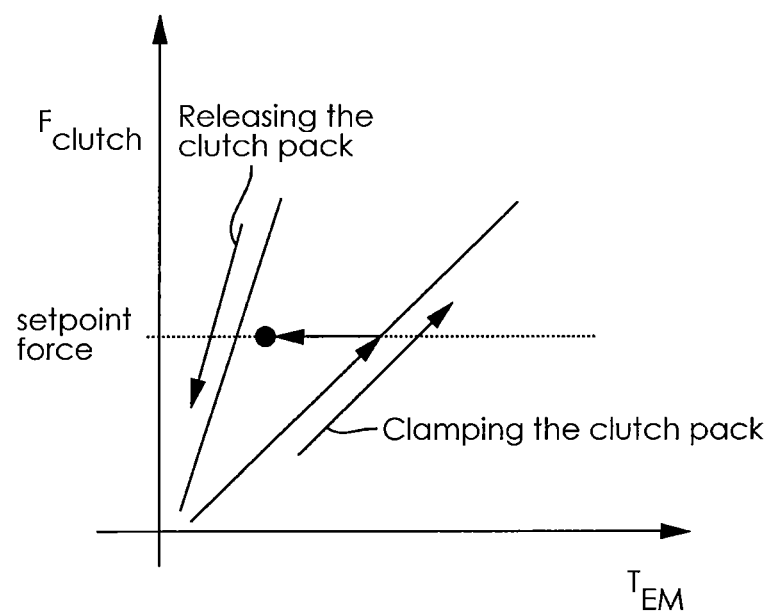
FIG. 10 is a graph illustrating an exemplary method for reducing a power consumption of the clutch actuation system shown in FIG. 3 according to the first method of the disclosure.

FIG. 10 is a graph illustrating an exemplary method for reducing the power consumption of the clutch actuation system 300. With regards to FIG. 10, it should be noted that the friction is according to the Coulomb model and that the actuation motor 304 of the clutch actuation system 300 is an electromotor. The method which can be used to reduce an amount of power consumption comprises the following steps:

1. An amount of motor torque required to reach a set point force is applied by the actuation motor 304 to the clutch pack 308. The set point force is a force at which the clutch pack is engaged;
2. Following the application of motor torque to the clutch pack, the amount of torque applied by the actuation motor 304 is decreased in a controlled way. An estimated or measured output value of motor torque is monitored so that the control unit 302 can control the output motor torque to meet the set point force value;
3. The set point force will be maintained as long as the amount of torque applied by the actuation motor 304 is greater than a corresponding torque value associated with a release curve of the clutch actuation system 300; and
4. Based on an identified relationship between the actuation force applied by the actuation motor 304 or position and output torque applied by the clutch pack 308, a feed-forward control is used to lower an amount of actuation power required for a requested output torque.

Through use of the above described method, an amount of power consumption of the clutch actuation system 300, and particularly an amount of power consumption of the actuation motor 304, is reduced.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A method to estimate an amount of force in a clutch pack, comprising:
   providing a clutch actuation system, wherein said clutch actuation system comprises a control unit, an actuation motor, a force translational device and a clutch pack;
   operating said actuation motor to produce a motor torque to apply a set point force to said clutch pack;

monitoring a position of said actuation motor and said amount of motor torque being applied to said clutch pack by said actuation motor at said set point force;

determining one or more clutch clamping curves, wherein said one or more clutch clamping curves are determined based on a relationship between said position of said actuation motor and said amount of motor torque applied by said actuation motor at said actuator motor position;

determining one or more clutch releasing curves, wherein said one or more clutch releasing curves are determined based on a relationship between said position of said actuation motor and said amount of motor torque applied by said actuation motor at said actuator motor position;

modeling one or more frictional characteristics of said clutch actuation system by said control unit;

estimating an amount of clamping force and an amount of releasing force in said clutch pack by said control unit; and maintaining said amount of motor torque applied to said clutch pack between said one or more clutch clamping curves and said one or more clutch releasing curves at said set point force.

2. The method to estimate an amount of force in a clutch pack of claim 1, wherein said force translational device is a ball and ramp actuator that applies a force to actuate said clutch pack.

3. The method to estimate an amount of force in a clutch pack of claim 2, wherein said actuation motor is connected to a reduction gear set to selectively rotate said ball and ramp actuator.

4. The method to estimate an amount of force in a clutch pack of claim 1, wherein said clutch pack comprises an inner hub with a first plurality of clutch plates rotationally connected to an axle half shaft and an outer hub with a second plurality of clutch plates rotationally connected to a differential case.

5. The method to estimate an amount of force in a clutch pack of claim 1, wherein said model of said one or more frictional characteristics of said clutch actuation system is based on one or more frictional coefficients of said actuation motor, said force translational device or said clutch pack of said clutch actuation system.

6. The method to estimate an amount of force in a clutch pack of claim 1, wherein said model of said one or more frictional characteristics of said clutch actuation system is used to update a kiss point for said clutch pack.

7. The method to estimate an amount of force in a clutch pack of claim 1, further comprising the step of estimating an acceleration and an inertia of said clutch pack of said clutch actuation system.

8. The method to estimate an amount of force in a clutch pack of claim 1, wherein said estimation of said amount of clamping force in said clutch pack is based on $$CF_{BR} + J\frac{d^2\theta_{clamp}}{dt^2} + Tf = Tem_{clamp};$$

and wherein said estimation of said amount of releasing force in said clutch pack is based on $$CF_{BR} + J\frac{d^2\theta_{release}}{dt^2} - TF = Tem_{release}.$$

9. The method to estimate an amount of force in a clutch pack of claim 8, further comprising the step of estimating an amount of force generated by said force translational device for every position of said clutch actuation system; and wherein said estimation of said amount of force generated by said force translational device is based on $$F_{BR} = \frac{1}{2c}\left(Tem_{clamp} + Tem_{release} - J\left(\frac{d^2\theta_{clamp}}{dt^2} + \frac{d^2\theta_{release}}{dt^2}\right)\right).$$

10. The method to estimate an amount of force in a clutch pack of claim 1, further comprising the steps of logging measurements for said one or more clutch clamping curves and said one or more clutch releasing curves determined; and updating said one or more clutch clamping curves and said one or more clutch releasing curves by said control unit based on said measurements logged for said one or more clutch clamping curves and said one or more clutch releasing curves determined.

11. The method to estimate an amount of force in a clutch pack of claim 1, further comprising the step of identifying an amount of damage, wear or obstacles within said force translational device or said clutch pack of said clutch actuation mechanism.

12. The method to estimate an amount of force in a clutch pack of claim 11, wherein said amount of damage, wear or obstacles within said force translational device or said clutch pack of said clutch actuation mechanism are identified based on bumps or pits in said one or more clutch clamping curves or said one or more clutch releasing curves determined.

13. The method to estimate an amount of force in a clutch pack of claim 11, further comprising the step of warning a vehicle operator when said amount of damage, wear or obstacles within said force translational device or said clutch pack of said clutch actuation mechanism exceeds a predetermined threshold.

14. The method to estimate an amount of force in a clutch pack of claim 1, wherein said actuation motor is an electrically powered motor.

15. The method to estimate an amount of force in a clutch pack of claim 14, further comprising the step of decreasing said amount of motor torque applied to said clutch pack at said set point force.

16. The method to estimate an amount of force in a clutch pack of claim 15, further comprising the step of decreasing an amount of electrical current to said actuator motor during said maintaining step.

17. The method to estimate an amount of force in a clutch pack of claim 16, further comprising the step of using said control unit to determine and monitor an amount of electrical current used to engage said clutch pack by said actuation motor, to determine and monitor an amount of electrical current to maintain said motor torque between said one or more clutch clamping curves and said one or more clutch releasing curves at said set point force and to determine and monitor said decreasing electrical current to said actuation motor during said maintaining step.

* * * * *